(12) United States Patent
Alpern et al.

(10) Patent No.: US 7,793,266 B2
(45) Date of Patent: *Sep. 7, 2010

(54) METHOD, APPARATUS AND COMPUTER PROGRAM PRODUCT FOR OPTIMIZING ACCESS TO THE CONTENT OF A VIRTUAL APPLICATION CONTAINER ON A FIXED, READ-ONLY MEDIUM

(75) Inventors: Bowen L. Alpern, Peekskill, NY (US); Glenn Ammons, Albany, NY (US); Vasanth Bala, Rye, NY (US); Johannes C. Laffra, Raleigh, NC (US); Todd W. Mummert, Danbury, CT (US); Darrell Christopher Reimer, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/757,517

(22) Filed: Jun. 4, 2007

(65) Prior Publication Data
US 2008/0301205 A1 Dec. 4, 2008

(51) Int. Cl.
G06F 9/44 (2006.01)
G06F 9/45 (2006.01)
(52) U.S. Cl. .................. 717/127; 717/159; 717/174
(58) Field of Classification Search .................. None
See application file for complete search history.

(56) References Cited

U.S. PATENT DOCUMENTS 5,933,626 A * 8/1999 Mahalingaiah et al. ...... 712/227

(Continued)

OTHER PUBLICATIONS

Peter M. Chen and Brian D. Noble, "When Virtual Is Better Than Real", 2001, Proceedings of the 2001 Workshop on Hot Topics in Operating, cs.toronto.edu.*

(Continued)

*Primary Examiner*—Neveen Abel Jalil
*Assistant Examiner*—Polina Peach
(74) *Attorney, Agent, or Firm*—Harrington & Smith

(57) ABSTRACT

Disclosed is a method, apparatus and a computer program of a virtual execution environment. In one aspect thereof a data processor includes a read-only storage medium and a virtual machine monitor configured to execute a program in a virtual container. Prior to execution of the application a set of application components accessed during a phase change are recorded in the read-only storage medium in a manner predetermined to minimize the time needed to retrieve the set of components. At the occurrence of the phase change, or prior to the occurrence of a phase change if the files are prefetched, the virtual machine monitor retrieves the components from the read-only storage medium. In a further aspect thereof there is provided a packager of an application to be executed in a virtualization environment by a virtual machine monitor. The packager is responsive to receiving notification from a virtual machine monitor of an occurrence of contemporaneous file accesses, not associated with a known phase change of a virtual container, to evaluate the occurrence as a candidate phase change, and responsive to the evaluation indicating a presence of a previously unknown phase change, for recording the files accessed on a new read-only storage medium in the order accessed for use by the same or a different virtual machine monitor during another instance of execution of the application.

16 Claims, 3 Drawing Sheets

U.S. PATENT DOCUMENTS

| | | | | |
|---|---|---|---|---|
| 6,202,121 | B1* | 3/2001 | Walsh et al. | 711/100 |
| 6,442,585 | B1* | 8/2002 | Dean et al. | 718/108 |
| 7,062,567 | B2 | 6/2006 | Benitez et al. | 709/231 |
| 7,356,679 | B1* | 4/2008 | Le et al. | 713/1 |
| 2005/0262502 | A1* | 11/2005 | Lari et al. | 717/175 |
| 2006/0047974 | A1 | 3/2006 | Alpern et al. | 713/191 |
| 2007/0162957 | A1* | 7/2007 | Bartels | 726/2 |
| 2007/0226698 | A1* | 9/2007 | Cascaval et al. | 717/127 |

OTHER PUBLICATIONS

Greg Shultz Windows Vista: SuperFetch and External Memory Devices Feb. 16, 2006 TechRepublic http://articles.techrepublic.com.com/5100-10878_11-6039379.html.*

Vasanth Bala, Evelyn Duesterwald, Sanjeev Banerjia Dynamo: A Transparent Dynamic Optimization System 2000 Hewlett-Packard Labs 1 Main Street, Cambridge, MA 02142.*

PDS: A Virtual Execution Environment for Software Deployment, Bowen Alpern, et al., VEE '05, Jun. 11-12, 2005, Chicago, Illinois, USA, 11pgs.

* cited by examiner

4A: Prior to execution of a program in a virtual container, recording a set of files accessed during a phase change on a physical read-only storage medium in a manner predetermined to minimize the time needed to retrieve the set of files

4B: At the occurrence of the phase change, or prior to the occurrence of the phase change if the files are prefetched, accessing the physical read-only storage medium and retrieving the files.

4C: During execution of the application, detecting with a virtual machine monitor an event comprising an occurrence of contemporaneous file accesses not associated with a known phase change.

4D: Evaluating the event as a candidate phase change.

4E: In response to the evaluation indicating a presence of a previously unknown phase change, adding the files accessed to the physical read-only medium in the order accessed for use by the same or a different virtual machine monitor during another instance of execution of the application.

FIG. 4

METHOD, APPARATUS AND COMPUTER PROGRAM PRODUCT FOR OPTIMIZING ACCESS TO THE CONTENT OF A VIRTUAL APPLICATION CONTAINER ON A FIXED, READ-ONLY MEDIUM

STATEMENT OF GOVERNMENT RIGHTS

This invention was made with Government support under Contract No.: NBCH3039004 (DARPA) awarded by the Defense Advanced Research Projects Agency. The Government has certain rights in this invention.

CROSS-REFERENCE TO A RELATED APPLICATION

This patent application is related to commonly-owned U.S. patent application Ser. No. 11/757,511, filed on even date herewith, by: Bowen L. Alpern, Glenn Ammons, Vasanth Bala, Johannes C. Laffra, Todd W. Mummert and Darrell Reimer, entitled: "Method, Apparatus and Computer Program Product for Optimizing File Accesses for an Application Executing in a Virtual Container".

TECHNICAL FIELD

This invention relates generally to data processors and data processing methods and, more specifically, relates to data processor virtualization procedures and apparatus in the context of application virtualization and the optimization of file layout in memory that is based on information obtained during virtual execution of a corresponding application.

BACKGROUND

Virtual machines, particularly those that attempt to capture an entire machine's state, are increasingly being used as vehicles for deploying software, providing predictability and centralized control. The virtual environment provides isolation from the uncontrolled variability of target machines, particularly from potentially conflicting versions of prerequisite software. Skilled personnel assemble a self-contained software universe (potentially including the operating system) with all of the dependencies of an application, or suite of applications, correctly resolved. They then have confidence that this software will exhibit the same behavior on every machine, since a virtual machine monitor (VMM) will be interposed between it and the real machine.

Virtualization (system and application) technology has been gaining widespread commercial acceptance in recent years. System virtualization allows multiple operating system (OS) stacks to share common hardware resources such as memory and CPU. System virtualization is generally implemented as a mediation layer that operates between the OS and the hardware. Application level virtualization technologies allow multiple application stacks to share a common OS namespace, such as files and registry entries. Application level virtualization is generally implemented as a mediation layer that operates between the application processes and the OS. With system virtualization, an OS stack can be given the illusion that required hardware resources are available, whereas in reality they may be shared by multiple OS stacks. With application virtualization, an application can be given the illusion that its files and registry entries are exactly where it expects them to be on the host machine, whereas in reality multiple application install images may be sharing the same locations in the namespace.

General reference with regard to a virtual execution environment (one known as a Progressive Deployment System (PDS)) may be made to VEE '05, Jun. 11-12, 2005, Chicago, Ill., USA, "PDS: A Virtual Execution Environment for Software Deployment", Bowen Alpern, Joshua Aurbach, Vasanth Bala, Thomas Frauenhofer, Todd Mummert, Michael Pigott.

The two types of virtualization technology (i.e., system and application) operate at different levels of the stack, and their value propositions are complimentary. System virtualization enables encapsulation of the state of a complete OS and applications software stack within a virtual system container, while application virtualization enables encapsulation of the state of an application stack only within a virtual application container. Both types of virtualization allow their respective containers to be deployed and managed as an appliance, i.e., as a pre-installed and pre-tested environment within a secure region that is isolated from other stacks that share the same environment. This has significant commercial value from an IT management standpoint, since appliances provide greater robustness and security assurances than conventional install-based methods of deployment.

During software execution some files are required more frequently than other files, and there can exist "phase" changes in which multiple files are required in a short period of time. Application start-up is one particularly important phase change.

Access to some disk sectors is faster than to others. Rotating data storage devices (e.g., disk, such as read-only disks) spin at a constant rate. This implies that those tracks farthest from the center of a disk can be read more quickly than those closer to the center. It is known to exploit these characteristics by moving files observed to be accessed frequently to those disk sectors observed to be accessed quickly, thereby reducing disk latency and increasing the effective data transfer rate from disk.

If the files required for a phase change are widely separated, the seek-time to move from one file to the next can be a significant factor in the total time required to effect the phase change. This effect can manifest as an application appearing to take an inordinately long time to start. Existing products attempt to eliminate such effects by ordering files that are observed to be accessed within a short time window next to each other in the order that they were accessed.

Windows™ has an API that allows user processes to move files on disk. Diskeeper's I-FAAST™ technology exploits this API to rearrange files on disk to avoid seek latencies for a file observed to be accessed contemporaneously. This technology is said to be specifically developed to accelerate the speed of file access time in order to meet the heavy workloads of file-intensive applications, and monitors file usage and reorganizes those files that are used most for the fastest users of applications such as CAD/CAM, database applications, and graphic and video-intensive applications are said to experience an increase in speed and response.

U.S. Pat. No. 7,062,567, Intelligent Network Streaming and Execution System for Conventionally Coded Applications, states in col. 31, lines 4-10, that "frequently accessed files can be reordered in the directory to allow faster lookup of the file information. This optimization is useful for directories with large number of files. When the client machine looks up a frequently used file in a directory, it finds this file early in the directory search. In an application run with many directory queries, the performance gain is significant." However, this technique also does not address the layout of files on a fixed (read-only) data storage medium.

SUMMARY

The foregoing and other problems are overcome, and other advantages are realized, in accordance with the exemplary embodiments of this invention.

In a first aspect thereof there is provided a method that comprises, prior to execution of a program in a virtual container, recording a set of files accessed during a phase change on a physical read-only storage medium in a manner predetermined to minimize the time needed to retrieve the set of files and, at the occurrence of the phase change, or prior to the occurrence of a phase change if the files are prefetched, accessing the physical read-only storage medium and retrieving the files, or allowing an operating system to access the physical read-only storage medium and retrieve the files as they are needed by an application.

In a second aspect thereof there is provided a tangible computer-readable storage medium that stores data representing program instructions, the execution of which result in operations that include, prior to execution of a program in a virtual container, recording a set of files accessed during a phase change on a physical read-only storage medium in a manner predetermined to minimize the time needed to retrieve the set of files and, at the occurrence of the phase change, or prior to the occurrence of a phase change if the files are prefetched, accessing the physical read-only storage medium and retrieving the files, or allowing an operating system to access the physical read-only storage medium and retrieve the files as they are needed by an application.

In another aspect thereof there is provided a data processor that comprises a read-only storage medium and a virtual machine monitor configured to execute a program in a virtual container, where prior to execution of the application a set of application components accessed during a phase change are recorded on the read-only storage medium in a manner predetermined to minimize the time needed to retrieve the set of components. At the occurrence of the phase change, or prior to the occurrence of a phase change if the files are prefetched, the virtual machine monitor retrieves the components from the read-only storage medium, or allows an operating system to access the physical read-only storage medium and retrieve the files as they are needed by an application.

In a further aspect thereof there is provided a packager of an application to be executed in a virtualization environment by virtual machine monitor. The packager comprises means, responsive to receiving notification from a virtual machine monitor of an occurrence of contemporaneous file accesses not associated with a known phase change of a virtual container, for evaluating the occurrence as a candidate phase change; and means, responsive to the evaluation indicating a presence of a previously unknown phase change, for recording the files accessed on a new read-only storage medium in the order accessed for use by the same or a different virtual machine monitor during another instance of execution of the application.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4 is a logic flow diagram that is illustrative of a method, and an operation of a computer program, in accordance with exemplary embodiments of this invention.

DETAILED DESCRIPTION

The exemplary embodiments of this invention pertain to application virtualization, as well as to system virtualization. In particular, the exemplary embodiments of this invention provide a technique or techniques related to application virtualization, although aspects thereof are applicable as well to system virtualization. In particular, the exemplary embodiments of this invention provide an ability to optimize access to the components of a virtual application container when these components are made available on a fixed (read-only) medium, such as a digital versatile disk (DVD) or compact disk-read only memory (CD-ROM), as two non-limiting examples of fixed (read-only) medium.

Figure 1:
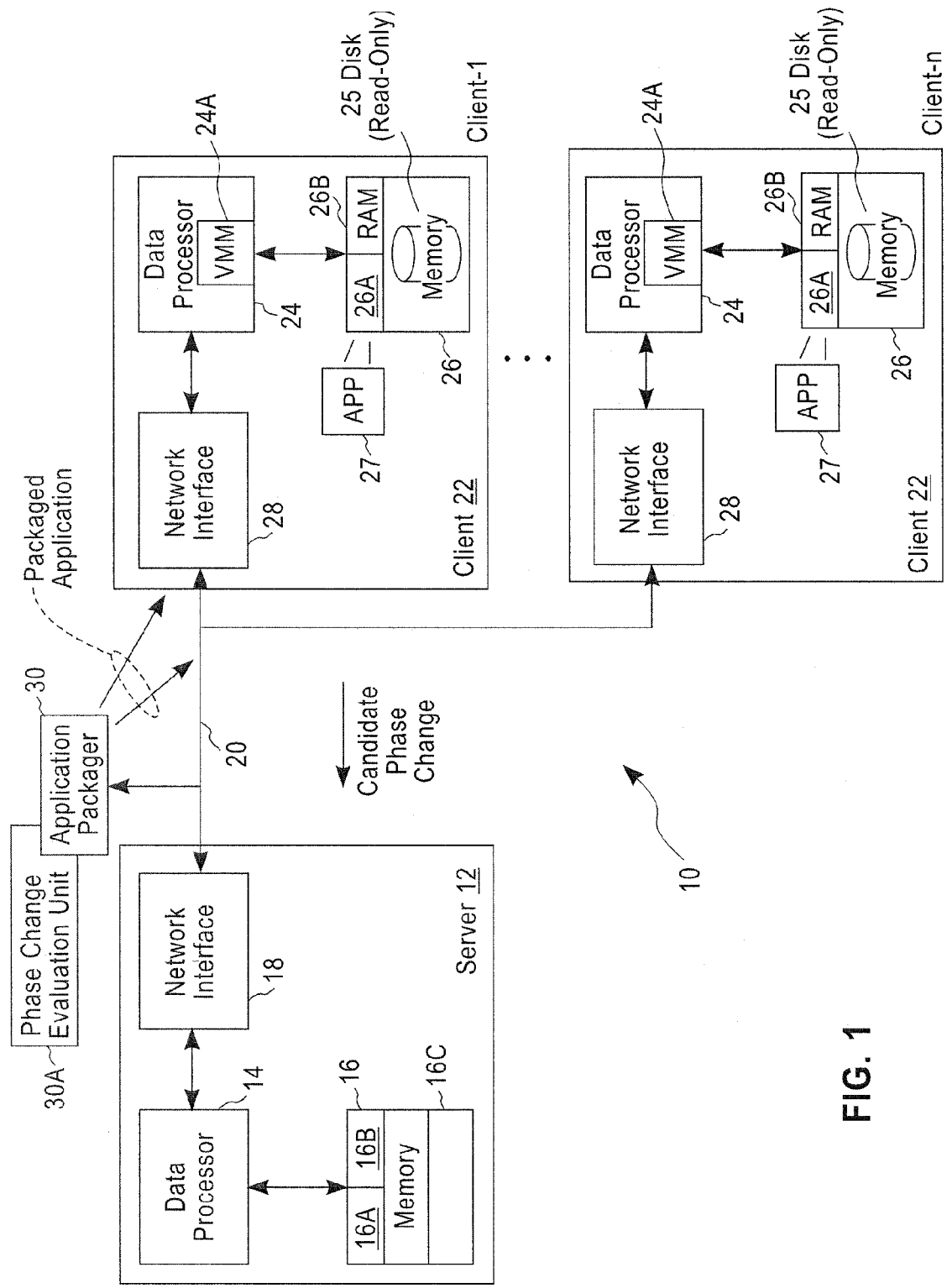
FIG. 1 is a system level block diagram of a virtualization environment containing a server and a plurality of clients that operate in accordance with exemplary embodiments of this invention.

FIG. 1 is a block diagram of a data processing system embodying a virtualization environment 10 that is suitable for use in implementing the exemplary embodiments of this invention. System 10 includes a server 12 that includes at least one control unit, such as at least one data processor 14 that is bidirectionally coupled to a memory 16. The memory 16 may be based on any suitable memory technology, and may include one or more magnetic rotating memory or tape memory, optical memory and semiconductor-based memory, as non-limiting examples. The memory 16 may be viewed as a tangible, computer-readable storage medium that stores data representing at least a computer program 16A containing program instructions for operating the data processor 14, as well as data 16B for use by the data processor 14 during program execution. The server 12 also includes a network interface 18 for bidirectionally coupling to at least one data communication network 20. Also coupled to the network 20 is at least one, and typically a plurality of the clients 22 (client_1, . . . client_n). Each client 22 may be assumed to also include at least one data processor 24 that is bidirectionally coupled to a memory 26, as well as a corresponding network interface 28. The memory 26 is assumed to include a computer program 26A implementing at least one application 27 that executes in a virtualized environment. The computer program may also implement an operating system (OS) of any suitable type. At least the application 27 is assumed to be embodied, at least in part, in (recorded on) at least one type of read-only memory medium, such as a rotating disk-type memory (disk) 25, such as a DVD or a CD-ROM as two non-limiting examples. The disk 25 can be assumed to include, or be operatively connected with, a suitable disk controller (not shown), and possibly also with a buffer memory, such as a cache memory, for reading data from the disk 25. The cache memory may be conveniently implemented using RAM memory 26B.

The application 27 may be any suitable application, such as a data base application or an image rendering application, as non-limiting embodiments, that is suitable for being executed in a virtual machine-type of environment.

The data processor 24 can be assumed to implement a virtual machine monitor (VMM) 24A functionality responsible for executing the virtual container within which the application 27 is executed.

Note that in at least some embodiments of interest to this invention the server 12 may not be present, and each client 22 (if there be more than one) can operate in a stand-alone, independent manner. As such, the presence of the server 12 in FIG. 1 should not be construed in a limiting sense upon practice and use of the exemplary embodiments of this invention.

FIG. 1 also shows for completeness an application packager 30, considered herein to be an entity, such as a software developer, that is a source of the read-only medium (e.g., a DVD or a CD-ROM), also referred to as a packaged application, that is played-back at the clients 22 in order to execute the application 27. The packaged application can be sent in a physical form, such as by mailing a disk, or it may be sent electronically over the network 20 (e.g., downloaded) to the clients 22, who in response record the downloaded application image onto a record-once read-only medium (e.g., onto a writable CD-ROM).

In general, it is typically the case that large software applications, such as the application 27, are partitioned into components at some level of granularity (e.g., libraries, files, archive entries and methods, as non-limiting examples). During the execution of a typical application the above-referenced phase changes occur in which a given set of new components (e.g., files) are required in a short period of time. However, it can be shown that application activation tends to occur in 'bursts' of related components being activated in close proximity (see FIG. 2 and the description of same below). If the components required for a phase change need to be loaded from a physical medium where they are widely separated, the seek time to physically move a read head from one component to the next can be significant factor in the time required to effect the phase change. This effect can manifest as an application appearing to take inordinately long to start or produce unpredictable delays in responsiveness. Seek times are a function of at least what type of medium is used, spin times, location on disk, fragmentation of components over multiple sectors, and contention from multiple clients.

The exemplary embodiments of this invention relate at least in part to the packaging of the components of the virtualized application 27 on the fixed medium (e.g., disk 25) in an order that enhances the performance of phase changes. That is, the components of the virtualized application 27 are arranged on the physical medium such that the components required at a phase change are loaded in the most efficient manner possible.

Phase changes may be discovered by executing the application 27 in different ways, and extensive empirical testing may be required to expose all of the phase changes of an application. Static analysis techniques may also be used to detect phase changes. Static analysis is a technique known in the art for obtaining information about the possible states that a program passes through during execution, without actually running the program on specific inputs. A static analysis procedure analyzes a program's behavior for all possible inputs and all possible states that the program can reach. To this end the program is "run in the aggregate", i.e., on abstract descriptors that represent collections of many states. Static analysis can be used to determine whether a program can reach an undesirable state that may compromise the usefulness of the program.

Non-limiting examples of various publications related to static analysis include the following:

Steven S. Muchnick, Advanced Compiler Design and Implementation. Morgan Kaufman Publishers, 1997;

Patrick Cousot and Radhia Cousot, Basic Concepts of Abstract Interpretation. In Building the Information Society, René Jacquard (Ed.), Kluwer Academic Publishers, pp. 359-366, 2004;

Benjamin C. Pierce, Types and Programming Languages. The MIT Press, 2002; and

Edmund M. Clarke Jr., Orna Grumberg, and Doron A. Peled, Model Checking, The MIT Press, 1999.

It is also within the scope of the exemplary embodiments of this invention for the virtual application container, via the VMM 24A, to detect previously unobserved phase changes and report them to the application packager 30. Such phase changes may then be incorporated into future packaging of the application 27.

By whatever technique the phase change information is derived, the components in the virtual application container are arranged so that components observed to be required in a phase change are loaded most efficiently. In practice, this implies follow one another in the order that they are required. When the first component is accessed, a large block containing it and several subsequent components can be transferred as a unit into the RAM memory 26B so that related components can be accessed quickly. Subsequent blocks may be prefetched from the disk 25 as preceding ones are read. Thus, and ideally, all of the components of a given phase transition experience a single seek latency.

The exemplary embodiments of this invention thus effectively combine buffered I/O and prefetching to reduce component seek times for phase changes occurring in an application executed in a virtual container.

In the event that some, or all, of the foregoing functionality exists in the OS, an alternative embodiment of this invention includes identifying the files associated with an application phase change and arranging them in such a way that the latent functionality of the OS can operate with maximal effectiveness.

Note that if one or more of the components (e.g., files) are required in multiple phase changes, they may be replicated on the physical medium, with possible operating system changes made to support this optimization as typically an operating system expects a file to be located in exactly one place, even if that file is read only. However, as the exemplary embodiments of this invention pertain to virtualization technology, the virtualization layer (e.g., the VMM 24A) may accommodate an added layer of abstraction to deal with the presence of multiple instances of a single file.

Figure 3:
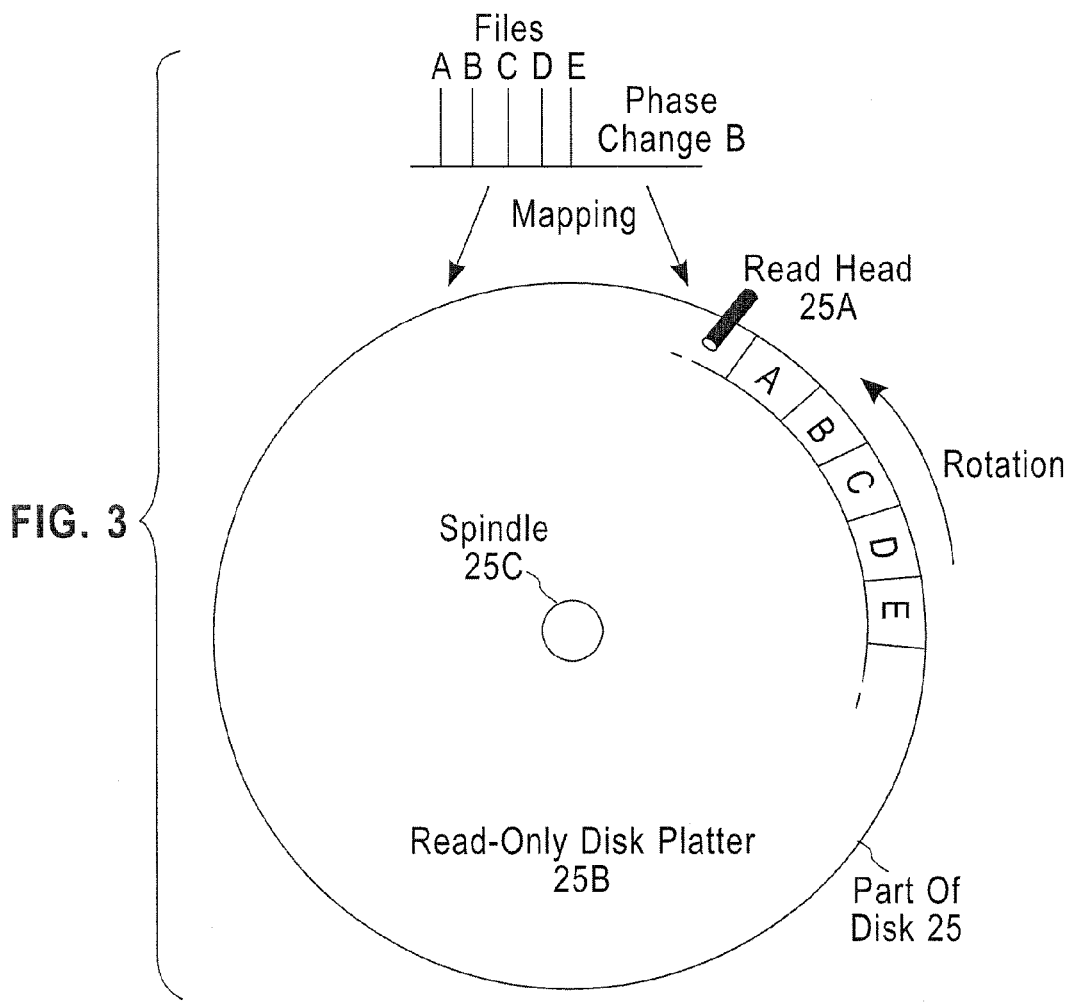
FIG. 3 is an example of a mapping of files A, B, C, D, E from the phase change B of FIG. 2 to the read-only storage medium (in this case a disk).

For particularly critical phase change scenarios, such as the startup of the application 27, components may be placed on sectors of the fixed medium that are known to have higher bandwidth, such as those sectors located nearer the outer edge of the disk platter, such as is shown in FIG. 3. Note further that those clients 22 with multiple forms of physical media may intentionally distribute phase change buffers to distinct media to further improve seek or prefetch times.

In accordance with exemplary embodiments of this invention it is assumed that contemporaneous file accesses originating from processes within the virtual container are causally related. Similarly, contemporaneous file accesses from one process within the container, and another from outside the container, are considered coincidental (i.e., not causally related). Phase change templates derived during, for example, testing or execution of the application on other client machines may also be consulted. As was noted above, if the VMM 24A of the client 22 executing the container from the fixed medium (disk 25) observes a file access sequence that does not appear to be associated with a known phase change it may send information descriptive of the sequence to the server 12, or to the application packager 30. In response, the application packager 30, using a phase change evaluation unit 30A, may apply static analysis techniques and/or some other program evaluation tool to determine if the sequence was coincidental, or a heretofore undiscovered phase change file sequence, and may then modify future packagings of the application 27 to incorporate the newly discovered phase change sequence.

Figure 2:
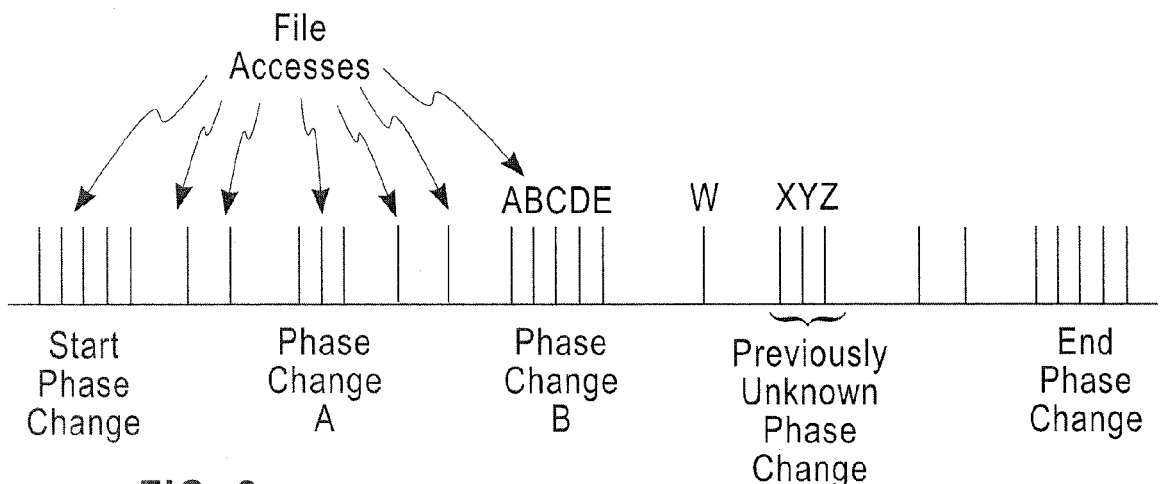
FIG. 2 is a graphical depiction of an exemplary execution by the VMM of FIG. 1 of a virtual container containing an application, and depicts several phase changes, each associated with some number of essentially contemporaneous file accesses to a read-only storage medium.

FIG. 2 is a graphical depiction of the execution by the VMM 24A of the virtual container containing the application 27. Note that several phase changes are indicated, each associated with some number of essentially contemporaneous file accesses to the disk 25. In this non-limiting example there is shown an application Start phase change and an application End phase change, as well as two intermediate phase changes A and B. Other file accesses may typically occur that are not specifically associated with a phase change. FIG. 2 also shows an occurrence of a previously unknown (candidate) phase change that is detected by the VMM 24A by the presence of some threshold number of file accesses that occur within some predetermined period of time (e.g., 5 milliseconds). In this case the client 22 (the VMM 24A) may inform the application packager 30 (which may be associated with the server 12, or reachable through the server 12, or reachable in general through the network 20) of the existence of this detected (candidate) phase change, as well as the identity of the files (x, y, z) accessed therein. It may also be useful to inform the application packager 30 of the identity of a file (or files) accessed prior to the previously undetected phase change (file w in this case), which may be used to implement a prefetch trigger for the files x, y, z, especially if the presence of the preceding file w is found in multiple instances of this previously undetected phase change by the VMM 24A in one or more of the clients 22.

In response to being informed of the presence of the previously undetected phase change, and preferable after verifying that the candidate phase change is an actual, previously unknown phase change via the phase change evaluation unit 30A, the application packager 30 may create, revise and/or update the layout of the components of the application 27 on the fixed medium in order to provide an updated disk 25 to existing clients 22 as well as new clients. Performing a static analysis technique is one suitable way to verify the presence of a previously unknown phase change.

FIG. 3 is an example of the mapping of the files A, B, C, D, E from the phase change B to the read-only disk 25. In this simple example the files are mapped (stored) in consecutive order (in order of access) on a single platter 25B of the read-only disk 25, such that they pass under a read head 25A in the ordered sequence needed, thereby reducing latency and increasing the data transfer rate from the disk 25. Furthermore, the files are shown as being stored at or near an outer edge of the disk platter 25B where the relative velocity is greater than it would be a location nearer to the spindle 25C. Of course, in multiple platter, multiple read head types of read-only disks other physical arrangements of the files A, B, C, D, E may be advantageous (e.g., they may be stored across multiple platters). However, in any case the files are intentionally positioned on the read-only physical storage medium to minimize the time required to access the files at the occurrence of a phase change, or prior to the occurrence of a phase change if the files are prefetched, thereby increasing the speed of execution of the virtual application 27.

Note that the read-only disk 25 may be embodied as a single disk drive, or as a plurality of disk drives, or as an array of disk drives, and may use magnetic-based data storage or optically-based data storage techniques.

In any of these embodiments the goal is to achieve a placement of the components, such as files, files needed for a phase change on a read-only physical storage medium so as to optimize (minimize) the time needed to access and obtain the components.

FIG. 4 is a logic flow diagram that is illustrative of a method, and an operation of a computer program, in accordance with exemplary embodiments of this invention. Based on the foregoing description it can be appreciated that the method includes, (Block 4A) prior to execution of a program in a virtual container, recording a set of files accessed during a phase change on a new physical read-only storage medium in a manner predetermined to minimize the time needed to retrieve the set of files; and (Block 4B) at the occurrence of the phase change, or prior to the occurrence of a phase change if the files are prefetched, accessing the physical read-only storage medium and retrieving the files.

The method as described above, and further comprising, (Block 4C) during execution of the application, detecting with a virtual machine monitor an event comprising an occurrence of contemporaneous file accesses not associated with a known phase change; and (Block 4D) evaluating the event as a candidate phase change. The method further includes, (Block 4E) in response to the evaluation indicating a presence of a previously unknown phase change, recording the files accessed on a new physical read-only storage medium in the order accessed for use by the same or a different virtual machine monitor during another instance of execution of the application.

In the foregoing method individual files of the set of files are stored in the order that they are accessed at the phase change.

The foregoing method also encompasses allowing an operating system to access the physical read-only storage medium and retrieve the files as they are needed by an application.

It should be appreciated that the exemplary embodiments discussed above can be used in a number of virtualization embodiments and architectures, and is not limited for use in the one described above and shown in FIG. 1. In addition, the exemplary embodiments are well suited for use in systems similar to or based on the above-referenced PDS, which is a virtual execution environment and infrastructure designed specifically for deploying software, or "assets", on demand while enabling management from a central location. PDS intercepts a select subset of system calls on a target machine to provide a partial virtualization at the operating system level. This enables an asset's install-time environment to be reproduced virtually while otherwise not isolating the asset from peer applications on the target machine. Asset components, or "shards", are fetched as they are needed (or they may be pre-fetched), enabling the asset to be progressively deployed by overlapping deployment with execution. PDS may deploy assets from a server across a network or from a read-only data medium attached locally. Cryptographic digests, or other mechanisms, may be used to eliminate redundant shards within and among assets, which enables more efficient deployment. A framework is provided for intercepting interfaces above the operating system (e.g., Java class loading), enabling optimizations requiring semantic awareness not present at the OS level.

Reference may also be made to US Patent Application No.: 2006/0047974, incorporated by reference herein.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. As but one example, the application packager 30 may use a technique other than static analysis when presented with a candidate phase change by a VMM 24A, or it may use static analysis in combination with another technique, such as dynamic analysis of the program. However, all modifications of the teachings of this invention will still fall within the scope of the embodiments of this invention.

Further, as employed herein a "new" read-only data storage medium may be the same or a different read-only data storage medium. For example, if a given read-only data storage medium is erasable, then it may be re-used to include new files related to a newly discovered phase change, while still be considered as a "new" read-only data storage medium.

Further, it should be noted that in some embodiments the OS may be resident at the server 12.

In addition, as employed herein "recording" is intended to encompass any technique for placing data onto a read-only data storage medium including, but not limited to, magnetic recording and optical recording techniques.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method, comprising:
   prior to execution of a program comprising an application in a virtual container, recording a set of files accessed during a phase change of the application on a physical read-only storage medium in a manner predetermined to minimize the time needed to retrieve the set of files when the files are retrieved from the physical read-only storage medium during the execution of the application in the virtual container; and
   in response to the execution of the application in the virtual container, permitting one of:
   (i) accessing the physical read-only storage medium and retrieving the set of files, or
   (ii) allowing an operating system to access the physical read-only storage medium and retrieve the set of files as needed by the application, the accessing or allowing occurring at one of:
   an occurrence of the phase change, or when the files are prefetched, prior to the occurrence of the phase change,
   wherein the accessing or allowing occurs so that the files are retrieved from the physical read-only storage medium according to the manner predetermined to minimize the time needed to retrieve the set of files;
   during execution of the application in the virtual container, detecting with the virtual machine monitor an event comprising an occurrence of contemporaneous file accesses not associated with a known phase change, wherein detecting with the virtual machine monitor an event further comprises detecting contemporaneous file accesses originating from at least two processes within the virtual container or from at least one process within the virtual container and at least one process outside the container; and
   evaluating the event as a candidate phase change, wherein evaluating further comprises determining the contemporaneous file accesses originating from the at least two processes are related and determining the contemporaneous file accesses originating from the at least one process within the virtual container and the at least one process outside the container are not related, and using information about relationships of the contemporaneous file accesses in order to evaluate the contemporaneous file accesses as the candidate phase change.

2. The method of claim 1, where individual files of the set of files are recorded in the order that they are accessed at the phase change.

3. The method of claim 1, where recording the set of files is performed by one of an application packager or by a client that receives downloaded data and records the downloaded data on the physical read-only storage medium.

4. The method of claim 1, where the physical storage medium comprises at least one disk.

5. The method of claim 1, in response to the evaluation indicating a presence of a previously unknown phase change, recording the files accessed on a new physical read-only storage medium in the order accessed for use by the same or a different virtual machine monitor during another instance of execution of the application.

6. A tangible computer-readable storage medium storing data representing program instructions, the execution of which result in operations comprising:
   prior to execution of a program comprising an application in a virtual container, recording a set of files accessed during a phase change of the application on a physical read-only storage medium in a manner predetermined to minimize the time needed to retrieve the set of files when the files are retrieved from the physical read-only storage medium during the execution of the application in the virtual container; and
   in response to the execution of the application in the virtual container, permitting one of:
   (i) accessing the physical read-only storage medium and retrieving the set of files, or
   (ii) allowing an operating system to access the physical read-only storage medium and retrieve the set of files as needed by the application,
   the accessing or allowing occurring at one of:
   an occurrence of the phase change, or
   when the files are prefetched, prior to the occurrence of the phase change,
   wherein the accessing or allowing occurs so that the files are retrieved from the physical read-only storage medium according to the manner predetermined to minimize the time needed to retrieve the set of files;
   during execution of the application in the virtual container, detecting with the virtual machine monitor an event comprising an occurrence of contemporaneous file accesses not associated with a known phase change, wherein detecting with the virtual machine monitor an event further comprises detecting contemporaneous file accesses originating from at least two processes within the virtual container or from at least one process within the virtual container and at least one process outside the container; and
   evaluating the event as a candidate phase change, wherein evaluating further comprises determining the contemporaneous file accesses originating from the at least two processes are related and determining the contemporaneous file accesses originating from the at least one process within the virtual container and the at least one process outside the container are not related, and using information about relationships of the contemporaneous file accesses in order to evaluate the contemporaneous file accesses as the candidate phase change.

7. The tangible computer-readable storage medium of claim 6, where individual files of the set of files are recorded in the order that they are accessed at the phase change.

8. The tangible computer-readable storage medium of claim 6, where recording the set of files is performed by one of an application packager or by a client that receives downloaded data and records the downloaded data on the physical read-only storage medium.

9. The tangible computer-readable storage medium of claim 6, where the physical storage medium comprises at least one disk.

10. The tangible computer-readable storage medium of claim 6, in response to the evaluation indicating a presence of a previously unknown phase change, recording the files accessed on a new physical read-only storage medium in the order accessed for use by the same or a different virtual machine monitor during another instance of execution of the application.

11. The tangible computer-readable storage medium of claim 10, where the operations of evaluating and recording occur at an application packager that is coupled to the virtual machine monitor through a communications network.

12. A data processor, comprising:
a read-only storage medium; and
a virtual machine monitor configured to execute a program comprising an application in a virtual container, where prior to execution of the application a set of application components accessed during a phase change of the application is recorded on the read-only storage medium in a manner predetermined to minimize the time needed to retrieve the set of components when the components are retrieved from the physical read-only storage medium during the execution of the application in the virtual container, and the virtual machine monitor configured, in response to execution of the application in the virtual container, to perform one of:
(i) retrieving the set of components from the read-only storage medium, or
(ii) allowing an operating system to access the physical read-only storage medium and retrieve the set of components as needed by the application,
the performance occurring at one of:
an occurrence of the phase change, or
when the components are prefetched, prior to the occurrence of the phase change,
wherein the accessing or allowing occurs so that the components are retrieved from the physical read-only storage medium according to the manner predetermined to minimize the time needed to retrieve the set of components;
during execution of the application in the virtual container, detecting with the virtual machine monitor an event comprising an occurrence of contemporaneous component accesses not associated with a known phase change, wherein detecting with the virtual machine monitor an event further comprises detecting contemporaneous component accesses originating from at least two processes within the virtual container or from at least one process within the virtual container and at least one process outside the container; and
evaluating the event as a candidate phase change, wherein evaluating further comprises determining the contemporaneous component accesses originating from the at least two processes are related and determining the contemporaneous component accesses originating from the at least one process within the virtual container and the at least one process outside the container are not related, and using information about relationships of the contemporaneous component accesses in order to evaluate the contemporaneous component accesses as the candidate phase change.

13. The data processor of claim 12, where individual components of the set of components are recorded in the order that they are accessed at the phase change.

14. The data processor of claim 12, where an application packager is configured, in response to an evaluation indicating a presence of a previously unknown phase change, to add the components accessed to the read-only storage medium in the order accessed for use by the same or a different virtual machine monitor during another instance of execution of the application.

15. The data processor of claim 12, where at least one component is accessed for a plurality of phase changes, and where multiple instances of the at least one component are recorded in the read-only storage medium in association with those components accessed during each of the plurality of phase changes.

16. A method, comprising:
prior to execution of a program comprising an application in a virtual container, recording a set of files accessed during a phase change of the application on a physical read-only storage medium in a manner predetermined to minimize the time needed to retrieve the set of files when the files are retrieved from the physical read-only storage medium during the execution of the application in the virtual container;
in response to the execution of the application in the virtual container, permitting one of:
(i) accessing the physical read-only storage medium and retrieving the set of files, or
(ii) allowing an operating system to access the physical read-only storage medium and retrieve the set of files as needed by an application,
the accessing or allowing occurring at one of:
an occurrence of the phase change, or
when the files are prefetched, prior to the occurrence of the phase change, wherein the accessing or allowing occurs so that the files are retrieved from the physical read-only storage medium according to the manner predetermined to minimize the time needed to retrieve the set of files;
during execution of the program in the virtual container, detecting with the virtual machine monitor an event comprising an occurrence of contemporaneous file accesses not associated with a known phase change, wherein detecting with the virtual machine monitor an event further comprises detecting contemporaneous file accesses originating from at least two processes within the virtual container or from at least one process within the virtual container and at least one process outside the container; and
evaluating the event as a candidate phase change, wherein evaluating further comprises determining the contemporaneous file accesses originating from the at least two processes are related and determining the contemporaneous file accesses originating from the at least one process within the virtual container and the at least one process outside the container are not related, and using information about relationships of the contemporaneous file accesses in order to evaluate the contemporaneous file accesses as the candidate phase change;

fetching a plurality of software components at a predetermined time;

deploying the plurality of software components wherein a deployment of the plurality of software components overlaps an execution of the plurality of software components;

using a cryptographic digest to eliminate a redundant software component from the plurality of software components; and providing an intercepting interface above an operating system.

* * * * *